US008576141B2

(12) United States Patent
Takada et al.

(10) Patent No.: US 8,576,141 B2
(45) Date of Patent: Nov. 5, 2013

(54) THREE-DIMENSIONAL DISPLAY DEVICE AND IMAGE PRESENTATION METHOD

(75) Inventors: Hideaki Takada, Tokyo (JP); Munekazu Date, Tokyo (JP); Shiro Suyama, Tokyo (JP); Masahiro Ueno, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 1608 days.

(21) Appl. No.: 11/817,588

(22) PCT Filed: Dec. 13, 2006

(86) PCT No.: PCT/JP2006/324824
§ 371 (c)(1),
(2), (4) Date: Aug. 31, 2007

(87) PCT Pub. No.: WO2007/091373
PCT Pub. Date: Aug. 16, 2007

(65) Prior Publication Data
US 2009/0079662 A1    Mar. 26, 2009

(30) Foreign Application Priority Data
Feb. 6, 2006    (JP) ................. 2006-028058

(51) Int. Cl.
*G09G 5/00*    (2006.01)

(52) U.S. Cl.
USPC .............. 345/6; 345/1.1; 345/9; 359/462; 359/465; 359/466; 349/15; 348/51; 348/57; 348/58

(58) Field of Classification Search
USPC ............ 345/1.1, 8, 9, 6; 359/737, 609, 599, 359/462, 465, 466; 382/254; 349/15; 348/51, 57–58
See application file for complete search history.

(56) References Cited

U.S. PATENT DOCUMENTS

| | | | |
|---|---|---|---|
| 5,737,042 A * | 4/1998 | Shinohara et al. | 349/57 |
| 5,945,967 A | 8/1999 | Rallison et al. | |
| 6,906,762 B1 | 6/2005 | Witehira et al. | |
| 2004/0021666 A1 * | 2/2004 | Soll et al. | 345/474 |

(Continued)

FOREIGN PATENT DOCUMENTS

| | | |
|---|---|---|
| JP | 2001-054144 | 2/2001 |
| JP | 2004-333869 | 11/2004 |

(Continued)

OTHER PUBLICATIONS

International Search Report for PCT/JP2006/324824 mailed Mar. 20, 2007.

(Continued)

*Primary Examiner* — Lun-Yi Lao
*Assistant Examiner* — Olga Merkoulova
(74) *Attorney, Agent, or Firm* — Kilpatrick Townsend & Stockton LLP

(57) ABSTRACT

A three-dimensional display device includes a plurality of transmissive display units arranged in different depth positions in view from an observer and a moiré vanishing element for diffusing light. The moiré vanishing element has a spatial frequency characteristic to cut off a spatial frequency more than a spatial frequency having a cycle being twice as large as an interval of boundaries of pixels forming a first transmissive display unit arranged behind the moiré vanishing element in the view from the observer.

16 Claims, 13 Drawing Sheets

(56) References Cited

U.S. PATENT DOCUMENTS

| | | |
|---|---|---|
| 2005/0083246 A1 | 4/2005 | Saishu et al. |
| 2005/0152156 A1* | 7/2005 | Favalora et al. ............. 362/558 |
| 2006/0103951 A1* | 5/2006 | Bell et al. ...................... 359/737 |
| 2007/0165027 A1* | 7/2007 | Nakadaira et al. ............ 345/426 |

FOREIGN PATENT DOCUMENTS

| | | |
|---|---|---|
| JP | 2004-336290 | 11/2004 |
| JP | 2005-086414 | 3/2005 |
| JP | 2005-172969 | 6/2005 |
| JP | 2005-522715 | 7/2005 |
| WO | 02/35277 A1 | 5/2002 |
| WO | 03/079094 A2 | 9/2003 |

OTHER PUBLICATIONS

Supplementary European Search Report, European Patent Application No. 06834579, mailed Feb. 23, 2012.

Okui, et al., "Moire Fringe Reduction by Optical Filters in Integral Three-Dimensional Imaging on a Color Flat-Panel Display", Applied Optics, Optical Society of Washington, D.C., vol. 44, No. 21, Jul. 20, 2005, pp. 4475-4483.

* cited by examiner

THREE-DIMENSIONAL DISPLAY DEVICE AND IMAGE PRESENTATION METHOD

TECHNICAL FIELD

The present invention relates to a three-dimensional display device having a plurality of display devices arranged in different depth positions in view of an observer and an image presentation method, and in particular, a technique of preventing the occurrence of moiré (interference pattern).

BACKGROUND OF ART

A three-dimensional display device described in Japanese Patent No. 3460671 (Patent Document No. 1) has a plurality of transmissive display units (for example, liquid crystal displays) arranged in different depth positions in view of an observer and displays a three-dimensional stereo image for the observer.

In the transmissive display unit for this three-dimensional display device, as shown in FIG. 1, there are arranged a plurality of pixels 10 whose barycentric positions becomes cyclic.

This three-dimensional display device therefore has an issue of the occurrence of moiré due to the interference of respective pixel patterns of the transmissive display units.

In order to prevent such an occurrence of moiré, Japanese Patent No. 3335998 (Patent Document No. 2) describes a technique of disposing a diffuser plate between the transmissive display units.

DISCLOSURE OF THE INVENTION

However, Patent Document No. 2 does not disclose a condition for vanishing the moiré at all.

In order to address the above-mentioned issue, an object of the present invention is to provide a technique of optimizing a condition for vanishing moirés in a three-dimensional display device having a plurality of transmissive display units arranged in different depth positions in view of an observer and a moiré vanishing element.

In a first aspect of the present invention, a three-dimensional display device comprises a plurality of transmissive display units arranged in different depth positions in view from an observer and a moiré vanishing element that diffuses a light, wherein the moiré vanishing element has a spatial frequency characteristic to cut off a spatial frequency more than a spatial frequency having a cycle being twice as large as an interval of boundaries of pixels forming a first transmissive display unit arranged behind the moiré vanishing element in the view from the observer.

In a second aspect of the present invention, an image presentation method comprises arranging a plurality of transmissive display units and a moiré vanishing element for diffusing light in different depth positions in view from an observer, enhancing an original image so that the observer can see an image close to the original image when viewing a transmissive display unit behind the moiré vanishing element in view of the observer, and allowing the transmissive display unit behind the moiré vanishing element in view of the observer to display the image enhanced.

PREFERRED EMBODIMENTS FOR EMBODYING THE INVENTION

Figure 1:
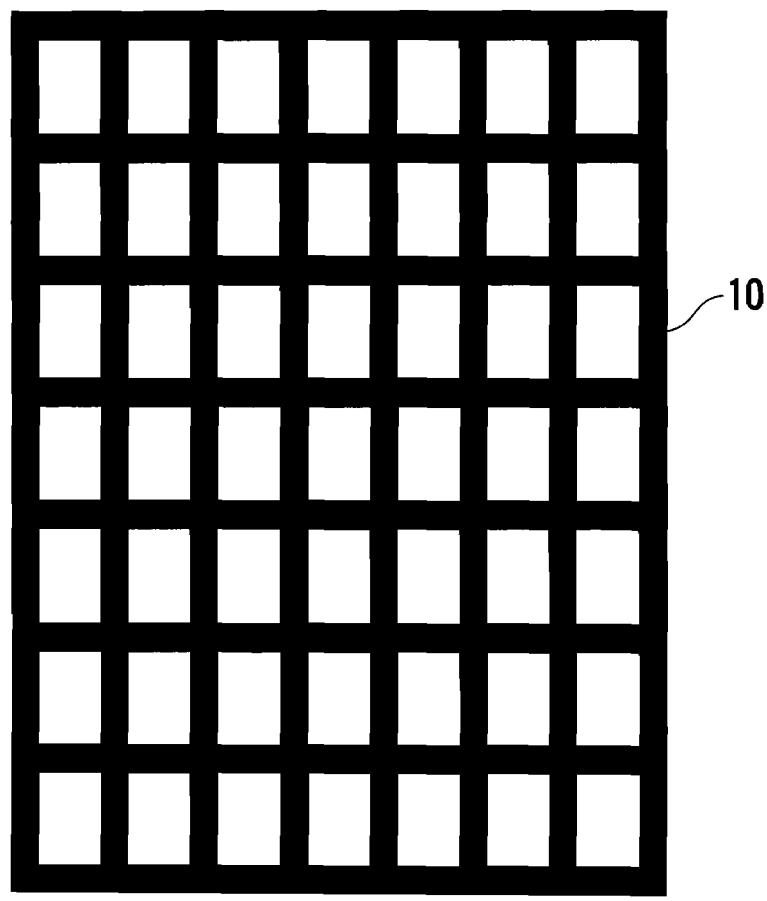
FIG. 1 is a view showing an arrangement of pixels in a conventional flat display.

There will be described below some embodiments of the present invention in detail with reference to drawings.

Note that, throughout all of the drawings to explain the embodiments, elements having the same function are indicated with the same reference numerals respectively and their overlapping descriptions are eliminated.

1$^{st}$. Embodiment

Figure 2:
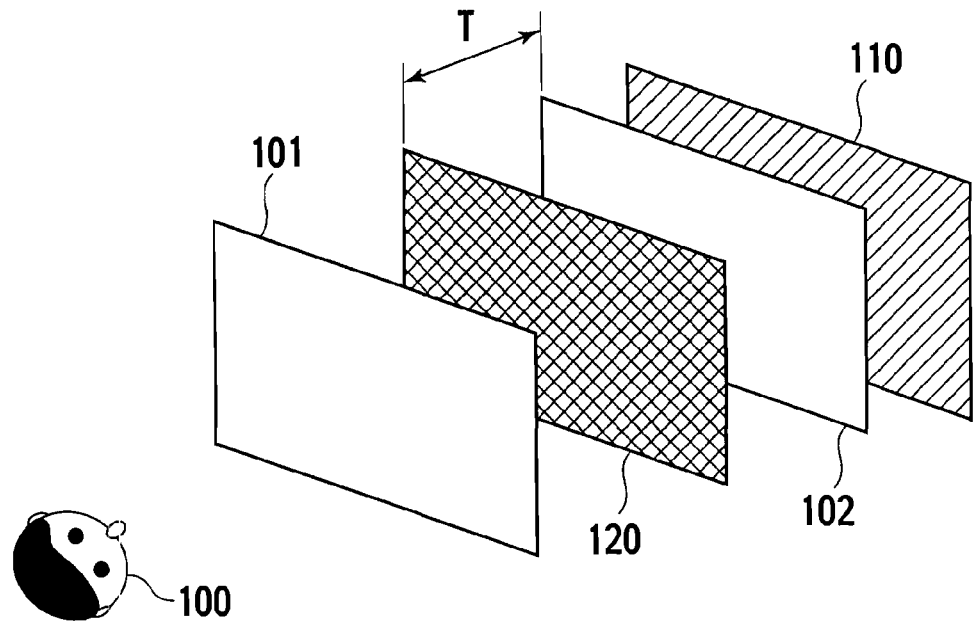
FIG. 2 is a typical view showing a schematic constitution of a three-dimensional display device in accordance with a first embodiment of the present invention.

FIG. 2 is a typical view showing the schematic constitution of the three-dimensional display device in accordance with the first embodiment of the present invention.

According to this embodiment, as shown in FIG. 2, there are arranged transmissive display units 101, 102 in front of an observer 100. Assume here that the transmissive display unit 101 is arranged to be closer to the observer 100 than the transmissive display unit 102.

It is possible in this embodiment to present a deep image to the observer 100 by allowing the transmissive display unit 101 to display a motion picture, such as vehicle, while allowing the transmissive display unit 102 to display a background image.

Here, there can be used, as the transmissive display units 101, 102, liquid crystal display devices or EL display devices etc. There can be recommended as the liquid crystal display device, for example, Twisted Nematic LCD, In-plane LCD, homogeneous LCD, ferroelectric LCD, guest-host LCD, polymer dispersed LCD, holographic polymer dispersed LCD or their combinations.

If the transmissive display units 101, 102 are liquid crystal display devices in this embodiment, it is necessary to arrange a light source 110 in a rearmost position from the observer 100, as shown in FIG. 2. While, if the transmissive display unit 102 is a self-luminous display device such as EL display device, the light source 110 is unnecessary and further the display device is not required to be transmissive.

Figure 3:
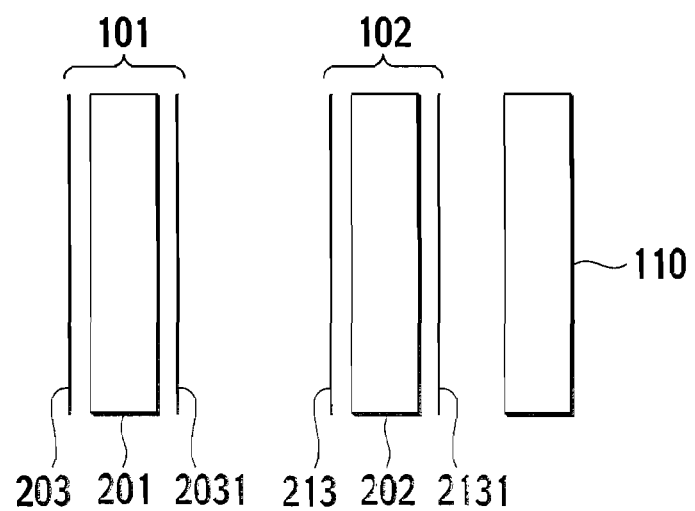
FIG. 3 is a typical view showing a schematic constitution of transmissive display units shown in FIG. 2.

FIG. 3 is a typical view showing the schematic constitution of one example of the transmissive display units 101, 102 of FIG. 2.

In the example shown in FIG. 3, the transmissive display unit 101 has a LCD panel 201 functioning as a polarization changeable device and polarization plates 203, 2031, while the transmissive display unit 102 has a LCD panel 202 functioning as a polarization changeable device and polarization plates 213, 2131.

The LCD panels 201, 202 further contain color filters (not shown). In addition, the light source (back light) 110 is arranged behind the polarization plate 2131 (on one side of the polarization plate 2131 opposite to the transmissive display unit 101).

As the LCD panels 201, 202 are capable of changing the polarization direction of light in units of pixels, it is possible to change the intensity of emitted light by the polarization direction of emitted light and the polarization direction of the polarization plates, thereby allowing the transmissivity of light to be varied as a whole.

Accordingly, by controlling the polarization direction of light passing through the pixels forming the LCD panels 201, 202 for each pixel, it is possible to independently change the transmissivity of the LCD panels 201, 202. Here, images displayed on the transmissive display units 101, 102 are two-dimensional colored images.

[Modification of Transmissive Display Unit of FIG. 3]

Figure 4:
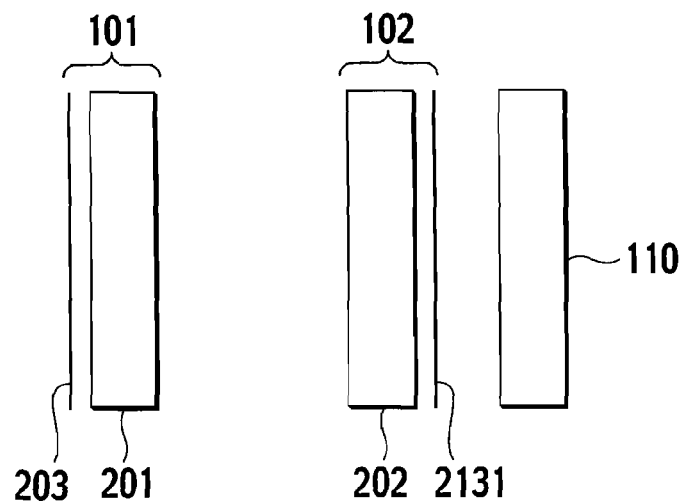
FIG. 4 is a typical view showing a schematic constitution of a modification of the transmissive display units shown in FIG. 3.

FIG. 4 is a typical view showing the schematic constitution of a modification of the transmissive display unit of FIG. 3.

In the example shown in FIG. 4, the transmissive display unit 101 has the LCD panel 201 functioning as a polarization changeable device and the polarization plate 203, while the transmissive display unit 102 has the LCD panel 202 functioning as a polarization changeable device and the polarization plate 2131.

That is, in the three-dimensional display device of FIG. 4, the LCD panel 201 and the LCD panel 202 are arranged between the polarization plate 203 and the polarization plate 2131. Further, the light source (back light) 110 is arranged behind the polarization plate 2131 (on one side of the polarization plate 2131 opposite to the transmissive display unit 101).

The LCD panel 201 and the LCD panel 202 are equivalent to devices, each of which is obtained by eliminating a polarization plate from Twisted Nematic LCD, In-plane LCD, homogeneous LCD, ferroelectric LCD, anti-ferroelectric LCD, vertically-aligned LCD and so on. In addition, the LCD panels 201, 202 could display colored images by either arranging color filters (not shown) inside the panels 201, 202 or performing field-sequential color display that changes the colors of the back lights at a high speed for synchronous display.

Even in the three-dimensional display device of FIG. 4, it is possible to independently change the transmissivity of the LCD panel 201 and the LCD panel 202 by controlling the polarization direction of light passing therethrough. In the three-dimensional display device of FIG. 4, however, it is necessary to control the polarization directions of the LCD panels 201, 202 while considering that the polarization direction of light changes during passing through the LCD panel 201 and the LCD panel 202.

As shown in FIG. 3, when using the transmissive display unit 101 where the polarization plates 203, 2031 are arranged on both sides of the LCD panel 201 and the transmissive display unit 102 where the polarization plates 213, 2131 are arranged on both sides of the LCD panel 202, the transmissivity of the whole device is reduced to darken the display since four polarization plates 203, 2031, 213, 2131 are interposed in the light path of irradiated light from the light source 110.

On the contrary, in the three-dimensional display device shown in FIG. 4, as the LCD panels 201, 201 are interposed between two polarization plates 203, 2131, it is possible to prevent the display from being darkened.

According to this embodiment, as shown in FIG. 2, a moiré vanishing element 120 is arranged between the transmissive display unit 101 and the transmissive display unit 102.

Here, the diffusivity of the moiré vanishing element 120 and an interval "T" between the moiré vanishing element 120 and the transmissive display unit 102 are established so that the smallest-cyclic structure of the transmissive display unit 102 (i.e. a transmissive display unit arranged behind the moiré vanishing element 120 in view from the observer 100) becomes invisible to the observer 100.

A moiré occurred in a three-dimensional display device is derived from so-called the "beat phenomenon" in spatial frequency area, which is caused by a situation in which, when viewing the three-dimensional display device with a predetermined distance, an observer observes the smallest-cyclic structure of one display device arranged rearward in view from the observer and the smallest-cyclic structure of another display device arranged forward in view from the observer with slight misalignment.

The observer then observes that a spatial frequency of the smallest-cyclic structure of the display device arranged rearward is larger than a spatial frequency of the smallest-cyclic structure of the display device arranged forward as much as the display device arranged rearward is far from the observer.

Therefore, if arranging the moiré vanishing element 120 having a constant diffusivity ahead of a display surface of the transmissive display unit 102 by the constant interval T and further operating the moiré vanishing element 120 as a low-pass filter in the spatial frequency area, which cuts off spatial frequencies more than a spatial frequency corresponding to the smallest-cyclic structure of the transmissive display unit 102 so that the smallest-cyclic structure of the transmissive display unit arranged rearward becomes invisible to the observer apart from the same device by a predetermined observing distance, then the above-mentioned beat phenomenon is not occurred and therefore no moiré is occurred.

Figure 5:
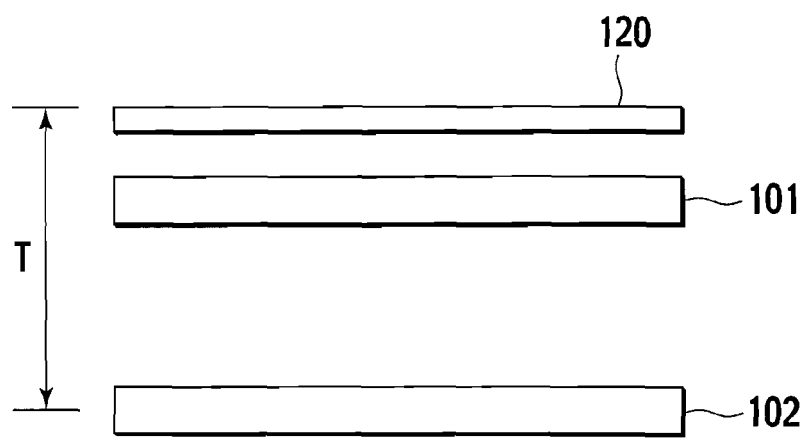
FIG. 5 is a typical view showing a schematic constitution of a modification of the three-dimensional display device of the first embodiment of the present invention.

Thus, the moiré vanishing element 120 can be arranged anywhere between the transmissive display unit 102 and the transmissive display unit 101 or, ahead of both of them as shown in FIG. 5 so long as the so-positioned vanishing element 120 allows the smallest-cyclic structure of the transmissive display unit 102 to be invisible to an observer.

In view of preventing the resolution of the display itself of the three-dimensional display device from being damaged rather, however, it is desirable to arranged the moiré vanishing element 120 close to the display surface of the transmissive display unit 102 (i.e. reduction of the interval "T") within the scope of allowing the smallest-cyclic structure of the transmissive display unit 102 to be invisible to an observer, as possible.

In this case, the above-mentioned smallest-cyclic structure is formed by, for example, color-filter array structure or black-matrix array structure. When the above-mentioned smallest-cyclic structure is a color-filter array structure, the diffusivity of the moiré vanishing element 120 and the interval T between the moiré vanishing element 120 and the transmissive display unit 102 are established so that the color-filter array structure becomes invisible to the observer 100.

While, when the above-mentioned smallest-cyclic structure is either a black-matrix array structure or a structure having no color filter such as field sequential color LCD, the diffusivity of the moiré vanishing element 120 and the interval T between the moiré vanishing element 120 and the transmissive display unit 102 are established so that the black-matrix array structure becomes invisible to the observer 100.

Thus, according to this embodiment, since the diffusivity of the moiré vanishing element 120 and the interval between the moiré vanishing element 120 and the transmissive display unit 102 are established so that the smallest-cyclic structure of the transmissive display unit 102 becomes invisible to the observer 100, it becomes possible to prevent the emergence of moiré.

Figure 19:
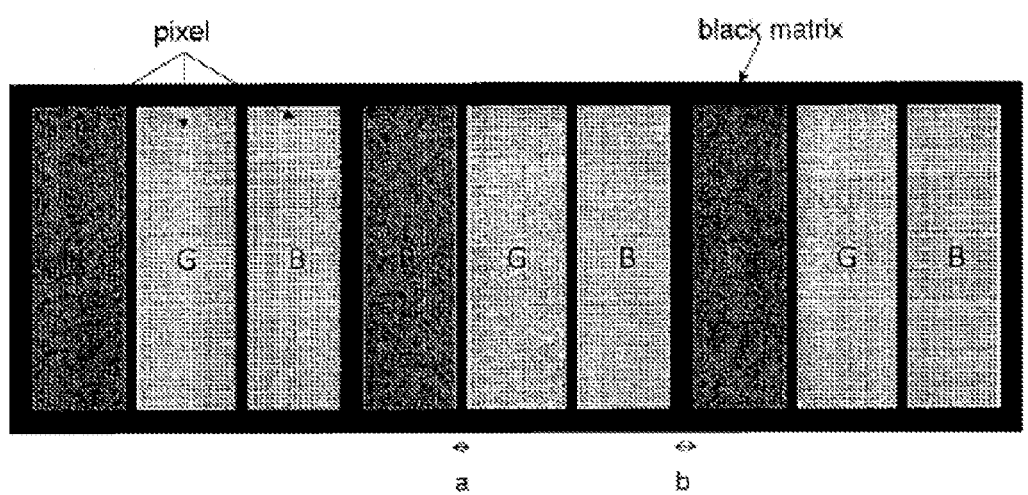
FIG. 19 is a view showing an arrangement of pixels in a transmissive display unit.

In case of the field sequential color display type, the double-cycle (FIG. 19, 2×a or 2×b) of a black-matrix width is sufficiently small in comparison with a cycle of displayable finest line-and-space. Therefore, as a low-pass filter that lets a spatial frequency equivalent to the latter cycle through while cutting off a spatial frequency equivalent to the former cycle is not required to have so precipitous cut-off characteristic, the invention has an advantage of facilitating both designing and manufacturing of the moiré vanishing element.

Figure 6:
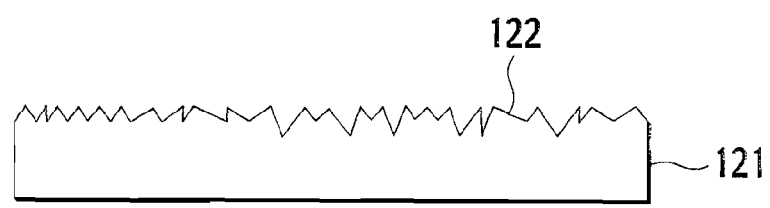
FIG. 6 is a typical view showing a schematic constitution of one example of a moiré vanishing element shown in FIG. 2.

FIG. 6 is a typical view showing the schematic constitution of one example of the moiré vanishing element 120 shown in FIG. 2. The moiré vanishing element 120 of FIG. 6 comprises a plate-shaped transparent material (a first transparent member) 121 whose surface is formed with a random convexo-concave (including a plurality of dimples 122), thereby diffusing light transmitted through the transparent material 121. In the present invention, the terminology "diffusion" means a phenomenon that a spreading angle of incident light is increased by refraction effect by such a convexo-concave structure, lens effect, scattering effect, or others.

In particular, if adopting an element having an adjustable spreading angle in the diffusion of light like a beam shaping diffuser (Light Shaping Diffuser: Physical Optics Corporation, www.poc.com 20600 Gramercy Place, Building 100, Torrance, Calif. 90501-1821, U.S.A.), then it is possible to cancel a moiré with a minimum blurring.

In FIG. 6, the dimples 122 are filled up with air whose refractive index is "1". While, if these dimples 122 are filled up with a transparent material (a second transparent member) having a different refractive index from that of the first transparent member, it is possible to realize an appropriate cut-off condition with a controlled spreading angle.

Further, by adopting a polarization plate or film in place of a transparent plate or film as a base material, the moiré vanishing element may be formed in one body with the polarization plate. In such a case, there can be expected an improvement in productivity of the moiré vanishing element. Commercially-available anti-glared polarization plates (e.g. NPF series anti-glared AGS1, AGS2B, AG30G, etc. made by Nitto Denko Co. Ltd.) are suitable to this integration.

The average diameter of the dimples 122 having the convexo-concave structure has to be smaller than a cycle of pixels, desirably, approx. several part of the cycle. In particular, if it is less than a tenth part of the cycle, then preferable non-textured picture quality can be realized.

It is further noted that when a plurality of moiré vanishing elements are laminated on each other, a spreading angle of the lamination amounts to the sum of spreading angles of respective elements. Thus, the lamination of several moiré vanishing elements allows the whole spreading angle to be adjusted with ease.

In the above way, by forming the surface of the moiré vanishing element with a random convexo-concave structure, a moiré due to interference between the convexo-concave structure and the cycle of pixels is produced with difficulty. Therefore, with no requirement of high accuracy for dimensions of the convexo-concave structure and its arrangement, the moiré vanishing element can be manufactured with ease.

We now set a coordinate system (x,y) on the surface of the convexo-concave structure and suppose θ (x,y) as an angle between emitted light and a normal line of the element when light enters into the moiré vanishing element 120 vertically.

Assume that "d" denotes an interval between one display unit in front and another display unit in the rear and "a" is the finest cycle that the display unit in the rear can display. When a root mean square of "tan θ" is generally equal to $(a/2d)^2$, it is possible to suppress the moiré without smudging an image particularly.

Note here that this embodiment is not limited to only two transmissive display units and therefore three or more transmissive display units may be adopted in the modification. In these cases, by providing a plurality of moiré vanishing elements 120 and arranging each moiré vanishing element 120 between the transmissive display units, it is possible to minimize a quantity of blurring on a farthest screen.

Even in these cases, the moiré could be cancelled if only the cut-off frequency of a low-pass filter for a display screen other than the frontmost display screen is generally equal to or less than a minimum frequency of line-and-space of each screen.

Figure 7:
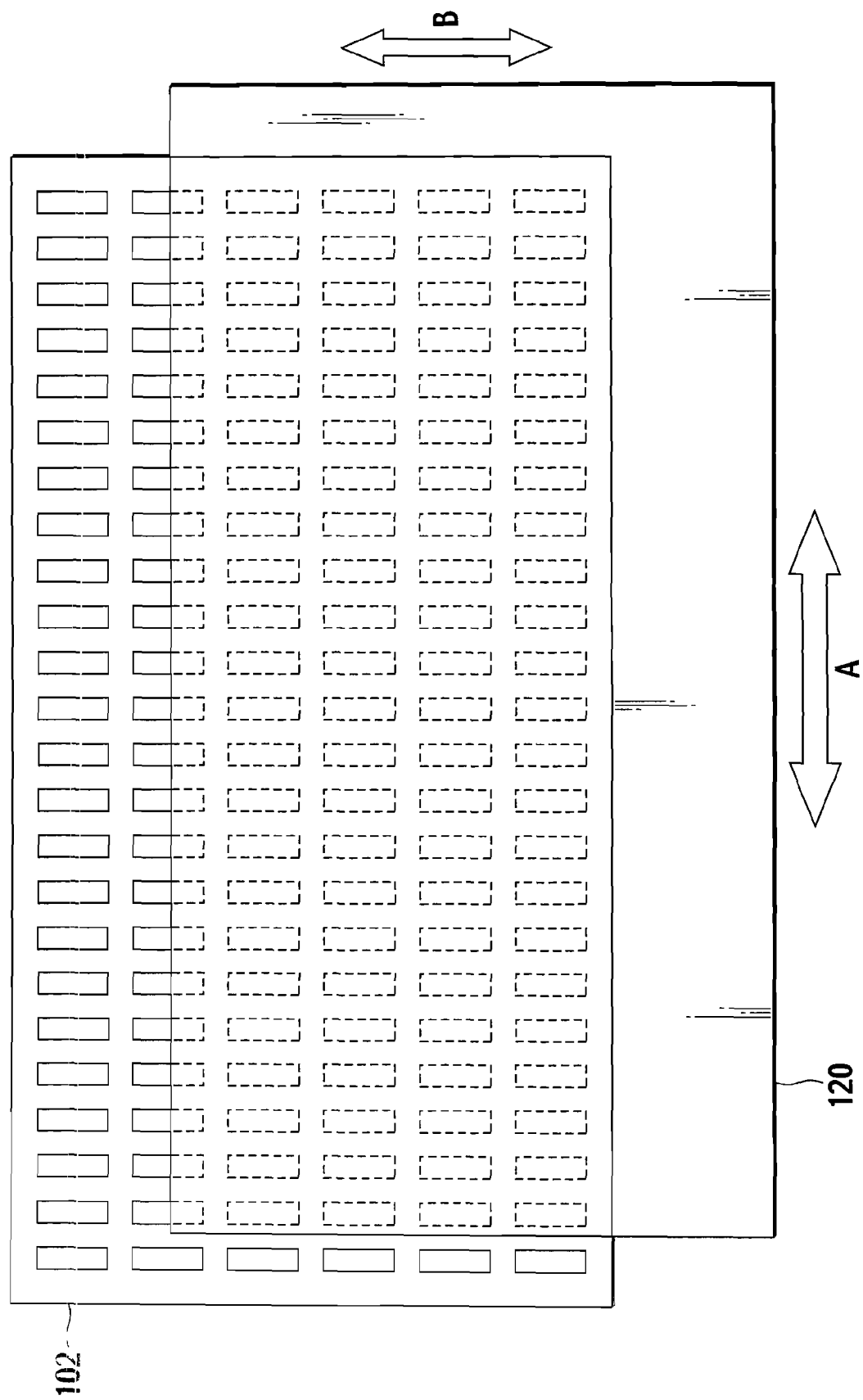
FIG. 7 is a typical view showing another example of the moiré vanishing element shown in FIG. 2.

FIG. 7 is a typical view showing another example of the moiré vanishing element of FIG. 2. This example is characterized in that the moiré vanishing element is provided with anisotropic diffusion characteristic. The moiré vanishing element 120 in this example is realized by differentiating the dispersion of the distribution of gradient angles of the plural dimples 122 in a direction in a surface having the concavo-convex structure formed thereon and the dispersion of the distribution of gradient angles of the plural dimples 122 in the perpendicular direction to the direction. Such an element is placed on the market as one product of the above-mentioned beam shaping diffuser. For instance, suppose that there is provided a transmissive display unit, having a striped color-filter image structure, far from the observer 100. In this case, it is possible to cancel the moiré by using a moiré vanishing element that exhibits a board spreading angle in a direction along which the color in the color filter varies while exhibiting a slight spreading angle equal to approx. width of the black matrix in a direction perpendicular to the above direction. In such a constitution, as the blurring of images is tiny in a direction where the spreading angle of the moiré vanishing element 120 is small, bringing this direction in line with the left-and-right direction of the face of the observer 100 (i.e. direction of an interval between observer's eyes, usually, horizontal direction) enables the observer 100 to get the impression that the display is sharp.

In FIG. 7, a direction "A" denotes a direction along which the moiré vanishing element 120 exhibits high diffusivity, while a direction "B" denotes a direction along which the moiré vanishing element 120 exhibits low diffusivity. Note here that it is not necessarily required that the direction B perfectly coincides with the left-and-right direction of the observer 100 or a direction along which striped pixels of uniform color do continue. Thus, the direction B may be somewhat deviated from such a direction so long as the blurring of an image recognized by the observer 100 does not get larger or no moiré is produced in a new direction.

Also, if a diffusion width of the moiré vanishing element 120 in the direction B exhibiting small diffusivity is too small in comparison with an interval (i.e. a width of black matrix) of boundaries of pixels forming the display unit, appropriate diffusion in both directions can be accomplished by somewhat rotating the moiré vanishing element 120. This blurs the black matrix, thereby enabling to vanish the moiré. Suppose that the display unit 102, which is arranged farther than the moiré vanishing element 120 in view of the observer 100, has striped color pixels. Then, if arranging the moiré vanishing element 120 upon rotating it so that the direction B exhibiting low diffusivity is deviated from the direction along which the striped pixels of uniform color do continue, moiré patterns in the direction perpendicular to the direction B exhibiting low diffusivity would disappear on a condition that an angle between these directions is less than 45 degrees.

$2^{nd}$. Embodiment

Figure 8:
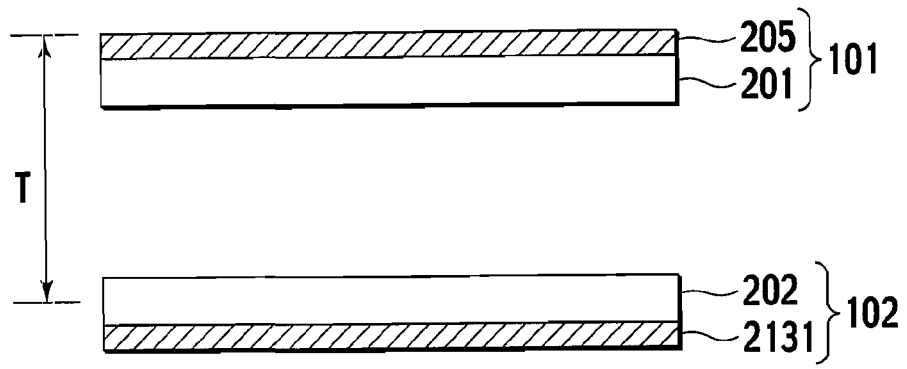
FIG. 8 is a typical view showing a schematic constitution of a three-dimensional display device in accordance with a second embodiment of the present invention.

FIG. 8 is a typical view showing a schematic constitution of the three-dimensional display device in accordance with the second embodiment of the present invention.

Note that FIG. 8 also illustrates an arrangement of adopting the transmissive display units 101, 102 of FIG. 4 as the transmissive display units of this embodiment.

Only differences between the second embodiment and the first embodiment will be described hereinafter.

In this embodiment, as shown in FIG. 8, the polarization plate itself has a function of the moiré vanishing element 120 by adopting a diffusible polarization plate 205 in place of the polarization plate 203.

In this way, according to this embodiment, since the polarization plate itself has the function of the moiré vanishing element 120, it is possible to reduce the number of components forming the three-dimensional display device.

$3^{rd}$ Embodiment

The three-dimensional display device of this embodiment differs from the three-dimensional display device of the first embodiment in that an optical element dividing a light into plural lights is used as the moiré vanishing element 120.

Only differences between this embodiment and the first embodiment will be described hereinafter.

Figure 9:
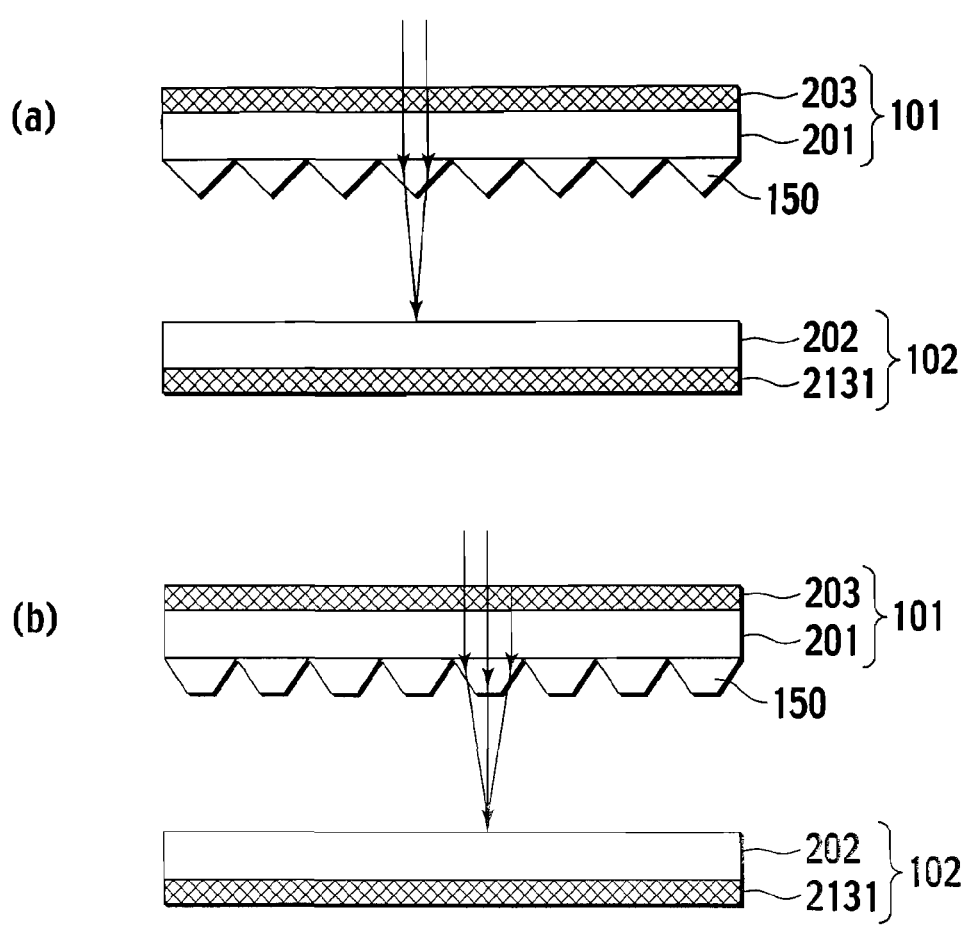
FIG. 9 is a typical view showing a schematic constitution of one example of a three-dimensional display device in accordance with a third embodiment of the present invention.

FIG. 9(*a*) and FIG. 9(*b*) are typical views showing schematic constitutions of examples of the three-dimensional display device of the third embodiment of the present invention.

Note that FIGS. 9(*a*) and 9(*b*) also illustrate arrangements of adopting the transmissive display units 101, 102 of FIG. 4 as the transmissive display units of this embodiment.

In the examples of FIGS. 9(*a*) and 9(*b*), a prism 150 as the optical element for dividing light into plural lights is arranged on an inside surface of the LCD panel 201 of the transmissive display unit 101.

Consequently, as either a double image of a picture displayed on the transmissive display unit 102 or its multiplex image (more than a triple image) is observed by the observer 100, the picture displayed on the transmissive display unit 102 becomes out of focus, enabling to prevent the occurrence of moiré.

Note that FIG. 9(*a*) illustrates a situation that a double image of the picture displayed on the transmissive display unit 102 is observed by the observer 100, while FIG. 9(*b*) illustrates a situation that a triple image of the picture displayed on the transmissive display unit 102 is observed by the observer 100.

Figure 10:
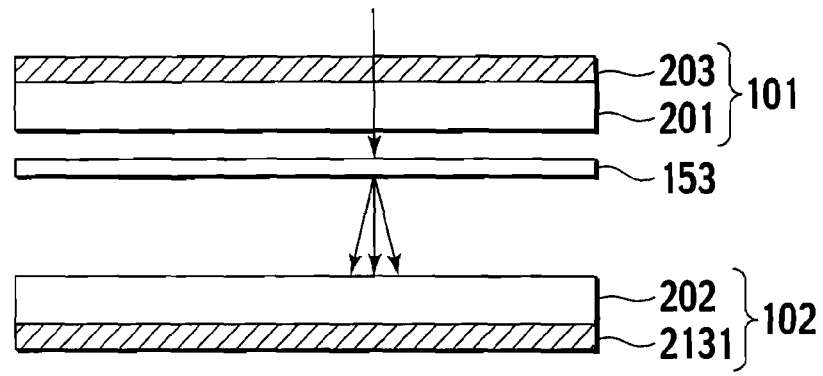
FIG. 10 is a typical view showing a schematic constitution of another example of the three-dimensional display device in accordance with the third embodiment of the present invention.

FIG. 10 is a typical view showing a schematic constitution of the other example of the three-dimensional display device of the third embodiment of the present invention Note that FIG. 10 also illustrates an arrangement of adopting the transmissive display units 101, 102 of FIG. 4 as the transmissive display units of this embodiment.

In the example of FIG. 10, a diffraction grating 153 as the optical element for dividing a light into plural lights is arranged between the transmissive display unit 101 and the transmissive display unit 102.

When arranging the diffraction grating 153 between the transmissive display unit 101 and the transmissive display unit 102 as shown in FIG. 10, the observer 100 observes either a double image of a picture displayed on the transmissive display unit 102 or its multiplex image (more than a triple image of the picture). Accordingly, the picture displayed on the transmissive display unit 102 becomes out of focus, enabling to prevent the occurrence of moiré.

In connection with FIG. 10, if the transmissive display unit 101 has a fine electrode structure (e.g. IPS) whose diffraction effect causes the picture displayed on the transmissive display unit 102 to be out of focus, it is also possible to remove the diffraction grating 153. In this case, as the observer 100 observes an out-of-focus image of the picture on the transmissive display unit 102, it becomes possible to prevent the occurrence of moiré.

$4^{th}$. Embodiment

Figure 11:
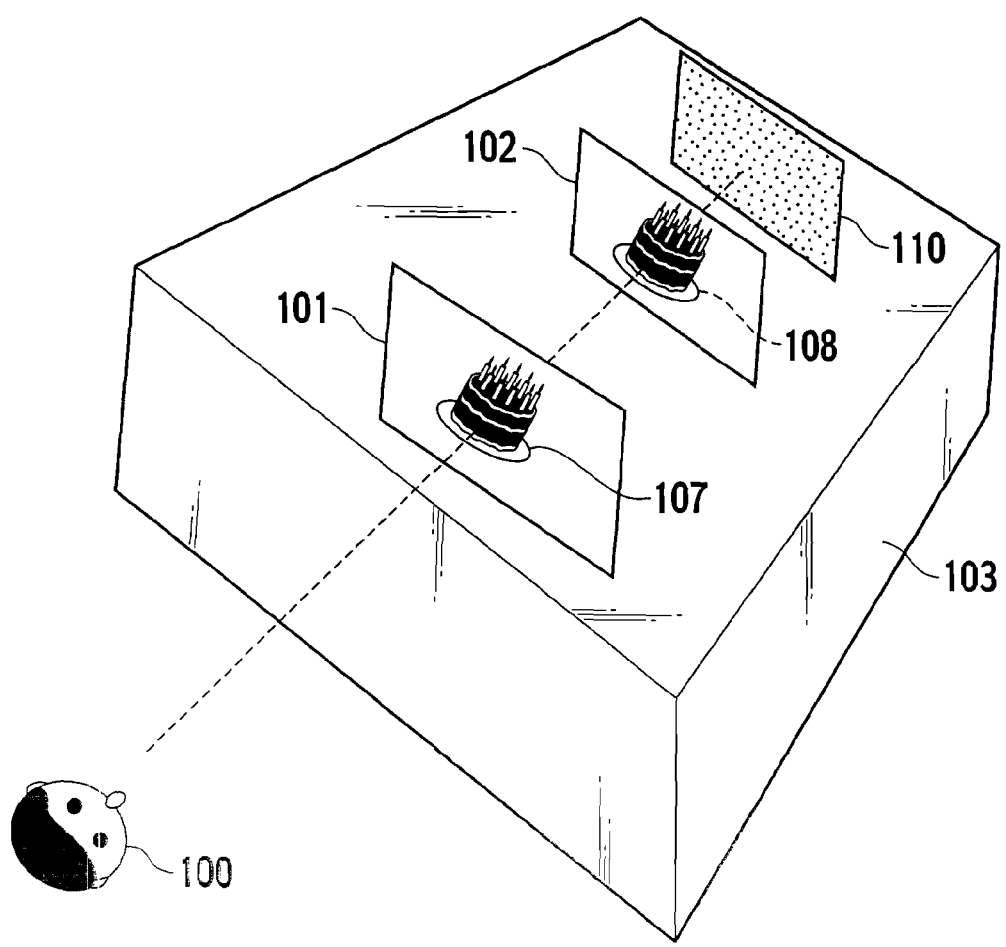
FIG. 11 is a typical view showing a schematic constitution of a three-dimensional display device in accordance with a fourth embodiment of the present invention.

FIG. 11 is a typical view showing a schematic constitution of the three-dimensional display device in accordance with the fourth embodiment of the present invention.

In this embodiment, as shown in FIG. 11, an optical system (three-dimensional display device) 103 is constructed by a plurality of transmissive display units, for example, the transmissive display units 101 and 102, various optical elements and the light source 110, all of which are in front of the observer 100. Assume here that the transmissive display unit 101 is close to the observer 100 in comparison with the transmissive display unit 102.

Liquid crystal display units or EL display units etc. may be used as the transmissive display units 101, 102. As the liquid crystal display unit, there can be recommended, for example, Twisted Nematic LCD, In-plane LCD, homogeneous LCD, ferroelectric LCD, guest-host LCD, polymer dispersed LCD, holographic polymer dispersed LCD or their combinations.

In addition, there may be used as the optical element, lens, all-reflective mirror, partial-reflective mirror, curved mirror, prism, polarization element, wavelength plate, etc.

In the three-dimensional display device 103 of FIG. 11, with the adoption of the liquid crystal display units 101, 102 as the transmissive display units, the light source 110 is arranged in the deepest position in view from the observer 100.

The three-dimensional display device 103 of this embodiment is a DFD (Depth Fused 3-D) type three-dimensional display device disclosed in Patent Document 1.

Hereinafter, principles of the DFD type three-dimensional display device 103 will be described with referent to FIGS. 11 to 16.

Figure 12:
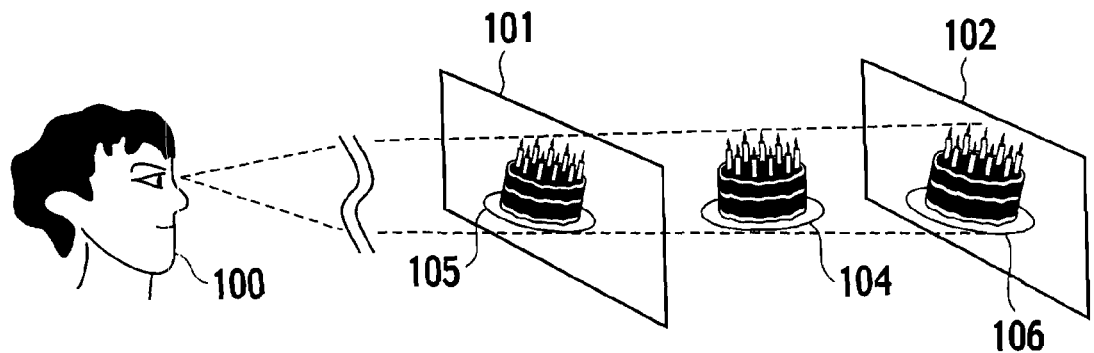
FIG. 12 is a view to explain a display principle of the three-dimensional display device in accordance with the fourth embodiment of the present invention.

First, as shown in FIG. 12, it is carried out to produce 2D images 105, 106 that are images (referred to as "2D images" hereinafter) obtained by projecting a three-dimensional object 104 to be presented to the observer 100 onto the transmissive display units 101, 102 in view from the observer 100.

There are a variety of methods as for the producing method of the 2D images 105, 106, for instance: a method of using two-dimensional images obtained by taking a picture of the three-dimensional object 104 in a direction of a sight line of the observer 100; a method of combining a plurality of two-dimensional images taken in different directions; a method of using combination technique or modeling in computer graphics, and so on.

The 2D images 105, 106 are displayed as 2D images 107, 108 on both of the transmissive display unit 101 and the transmissive display unit 102 so as to overlap each other in view of a point on a line connecting a left eye with a right eye of the observer 100.

For instance, the displaying can be accomplished by controlling the arrangement of respective center positions or barycentric positions of the 2D images 105, 106 and their scaling ratios.

An image that the observer 100 observes on the so-constructed three-dimensional display device 103 is produced since light emitted from the light source 110 is transmitted through the 2D image 108 and sequentially through the 2D image 107.

The most important point of this embodiment is to change the depth position of an image felt by the observer 100 by altering an allocation in transmissivity between the 2D image 107 and the 2D image 108 while keeping a constant luminance of the image observed by the observer 100 so as to be equal to the luminance of the three-dimensional object 104 to be displayed.

One example of this concept will be described hereinafter. Note that, for ease of understanding in spite of monochrome drawings, the image having smaller transmissivity is illustrated more densely in the figures.

For instance, when the three-dimensional object 104 is positioned on the transmissive display unit 101, the transmissivity of the transmissive display unit 101 is set in a manner that the luminance of the 2D image 107 becomes equal to the luminance of the three-dimensional object 104, as shown in FIG. 12. Thus, the transmissivity of the part of the 2D image 108 on the transmissive display unit 102 is set to a maximum value of the transmissive display unit 102.

Figure 13:
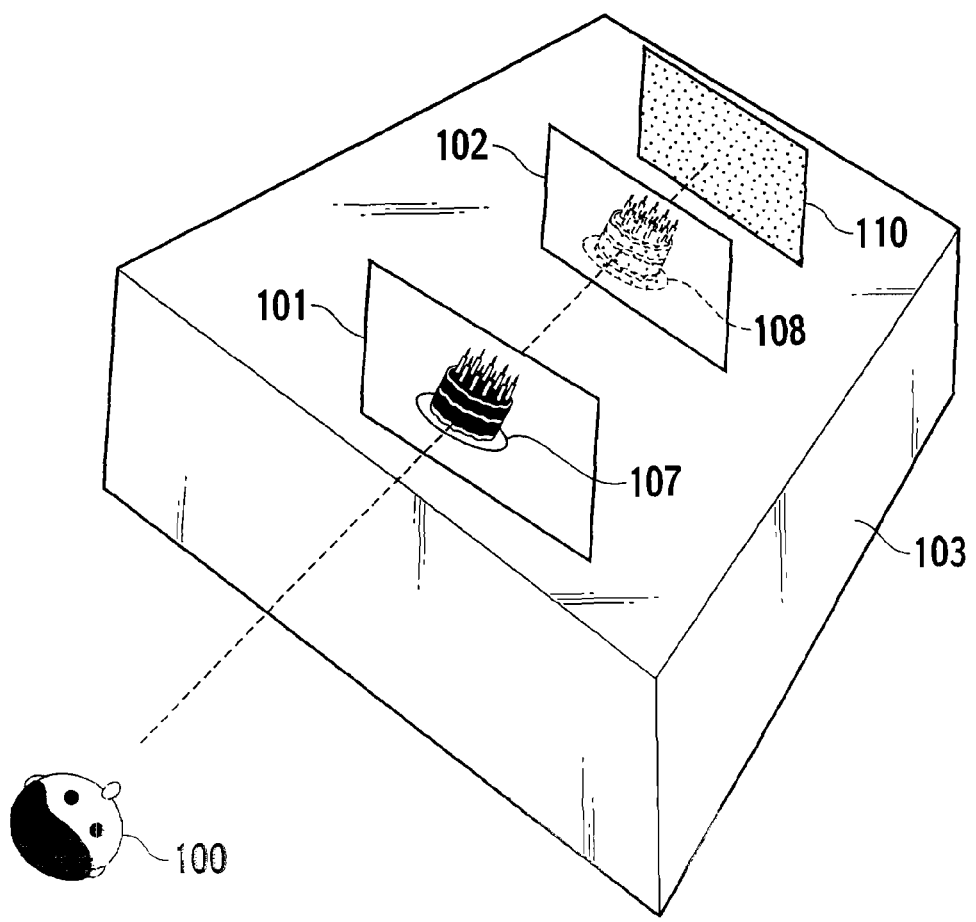
FIG. 13 is a view to explain the display principle of the three-dimensional display device in accordance with the fourth embodiment of the present invention.

Further, when the three-dimensional object 104 is kept far away from the observer 100 so as to be present in a position slightly closer to the transmissive display unit 102 rather than the transmissive display unit 101, the transmissivity of the part of the 2D image 107 on the transmissive display unit 101 is somewhat increased, while the transmissivity of the part of the 2D image 108 on the transmissive display unit 102 is somewhat decreased, as shown in FIG. 13.

Figure 14:
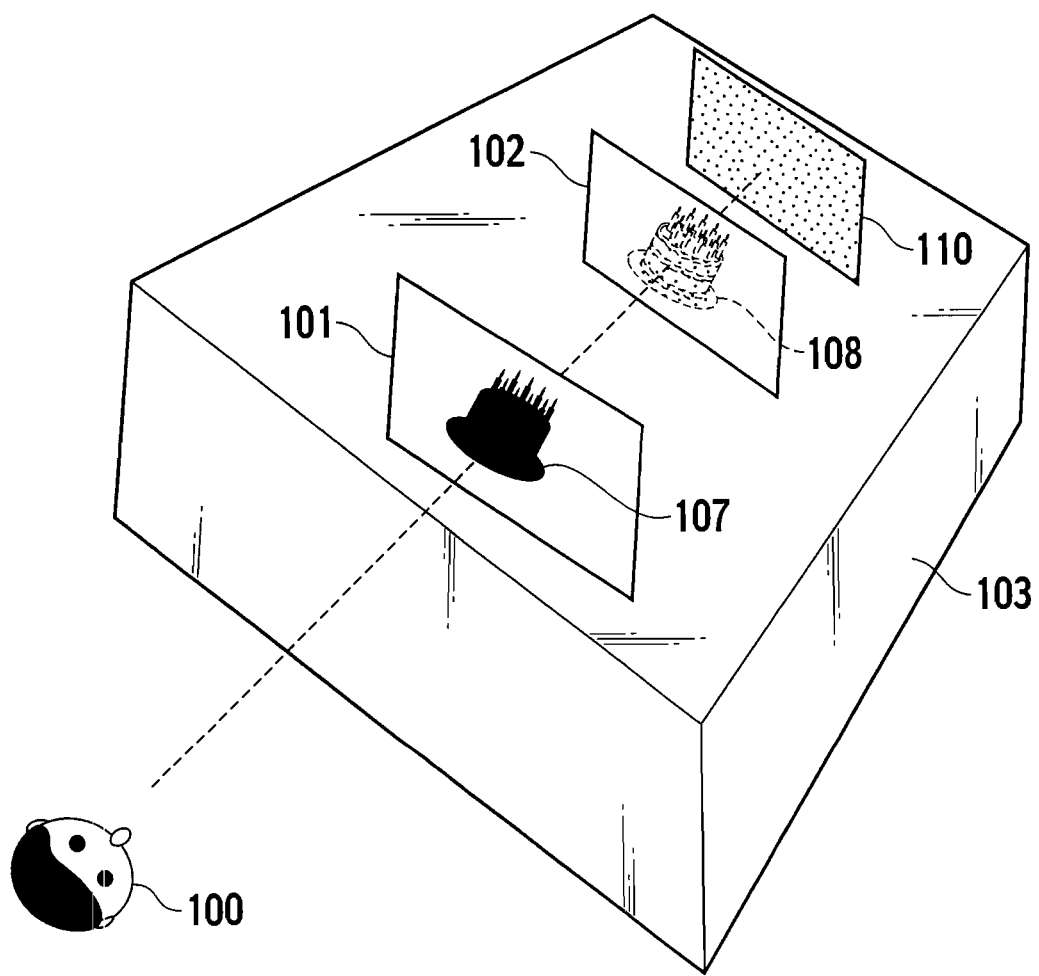
FIG. 14 is a view to explain the display principle of the three-dimensional display device in accordance with the fourth embodiment of the present invention.

Further, when the three-dimensional object 104 is kept farther away from the observer 100 so as to be present in a position further closer to the transmissive display unit 102 rather than the transmissive display unit 101, the transmissivity of the part of the 2D image 107 on the transmissive display unit 101 is further increased, while the transmissivity of the part of the 2D image 108 on the transmissive display unit 102 is further decreased, as shown in FIG. 14.

Figure 15:
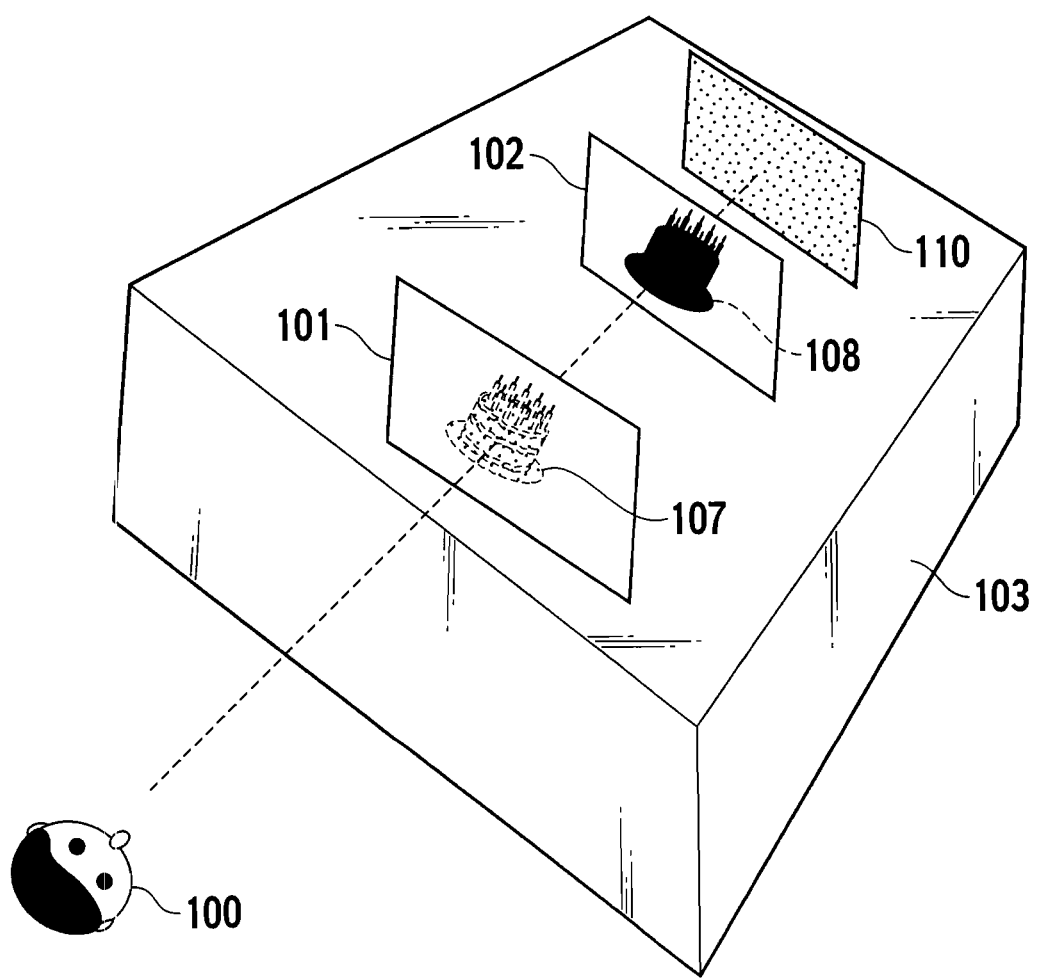
FIG. 15 is a view to explain the display principle of the three-dimensional display device in accordance with the fourth embodiment of the present invention.
Figure 16:
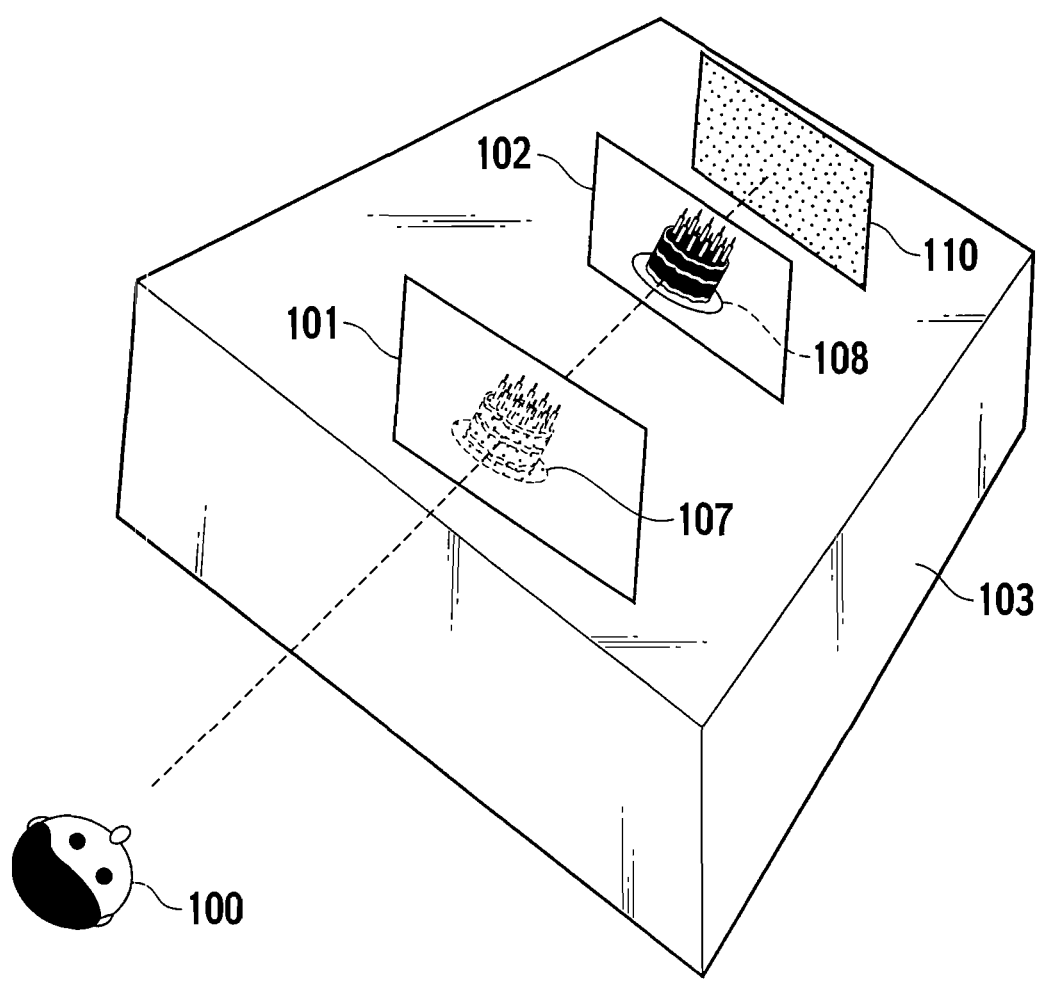
FIG. 16 is a view to explain the display principle of the three-dimensional display device in accordance with the fourth embodiment of the present invention.

Further, when the three-dimensional object 104 is positioned on the transmissive display unit 102, the transmissivity of the transmissive display unit 102 is set in a manner that the luminance of the 2D image 108 becomes equal to the luminance of the three-dimensional object 104, as shown in FIG. 15. Thus, the transmissivity of the part of the 2D image 107 on the transmissive display unit 101 is set to a maximum value of the transmissive display unit 102.

By displaying in this way, owing to human's physiologic or psychological factor or false illusion, the 2D images 107, 108 on display are observed by the observer 100 as if the three-dimensional object 104 were positioned between the transmissive display unit 101 and the transmissive display unit 102.

That is, for instance, if the transmissivity of the part of the 2D image 107 of the transmissive display unit 101 is set to be generally equal to that of the part of the 2D image 108 of the transmissive display unit 102, it is felt that the three-dimensional object 104 is present in the vicinity of a midpoint between the depth position of the transmissive display unit 101 and the depth position of the transmissive display unit 102.

In FIG. 11, although the light source 110 is arranged in the rearmost position in view of the observer 100, there would be no need of providing the light source 110 if the transmissive display unit 102 is a self-luminous display unit such as an EL display unit.

By adopting the technique explained in the above-mentioned embodiments on the above-mentioned three-dimensional display device, it becomes possible to prevent the occurrence of moiré caused by the interference between the smallest-cyclic structures of the transmissive display units 101, 102.

Note that the transmissive display units of FIGS. 3 and 4 are available for the transmissive display units 101, 102 shown in FIG. 11. Then, by changing the luminance of images viewed from the observer 100 with respect to the 2D images 107, 108 displayed on the transmissive display units 101, 102 as described with FIGS. 11 to 16, it is possible to display a three-dimensional on the transmissive display unit 101 or the transmissive display unit 102 or in an optional position between the transmissive display units 101, 102.

Hereinabove, the descriptions are directed to an arrangement where there are two transmissive display units for displaying 2D images and a three-dimensional object to be presented to the observer 100 is positioned between the transmissive display units. However, it is obvious that the similar constitution is applicable to an arrangement where there are three or more transmissive display units for displaying 2D images or a three-dimensional object for presentation is positioned in a different position from the former arrangement.

In addition, it is obvious that the display surface for a 2D image in this embodiment is not necessarily a flat surface and therefore the similar effect could be accomplished even if the display surface is any of spherical surface, ellipsoidal surface, quadratic surface and other complicated curved surfaces.

Note that the above descriptions explain a case in which the depth position of the whole three-dimensional object is explained with the use of the 2D images displayed on the transmissive display units 101, 102. However, the three-dimensional display device can be also utilized as both method and device for expressing the depth of a three-dimensional object itself as described in Patent Document No. 1.

Similarly, the three-dimensional display device of this embodiment is available to a situation that a three-dimensional object itself moves as described in Patent Document No. 1.

When a 2D image moves in a three-dimensional manner, the movements of the 2D image in horizontal/vertical directions can be expressed by motion pictures in the transmissive display units 101, 102 as similar to an ordinary case of the two-dimensional display device. As for the movement in the depth direction, as described in Patent Document No. 1, the motion picture of a three-dimensional image could be realized by temporally changing the luminance of the 2D images 107, 108 displayed on the transmissive display units 101, 102 (luminance in view of the observer 100).

Note that the terminology "cut-off frequency" of the present invention means not only a cut-off frequency in a monotone decreasing filter such as Lorenz filter but also a frequency that a major damping originates in a decreasing filter with vibrations such as Sinc-functional filter.

5$^{th}$ Embodiment

Figure 17:
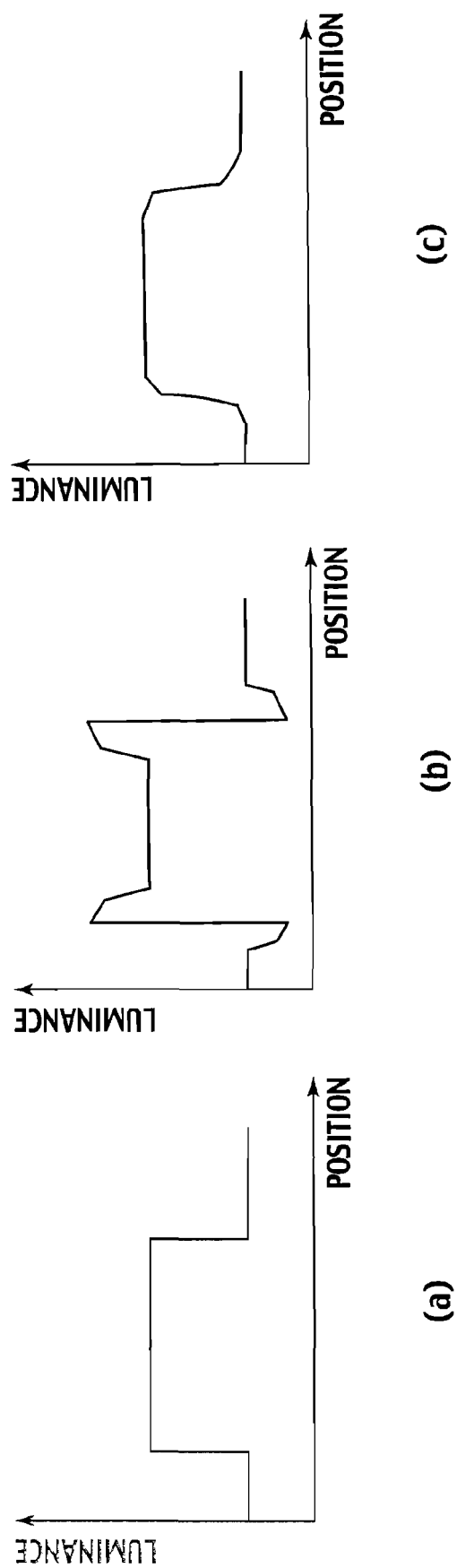
FIG. 17 is a view to explain an image presentation method in accordance with a fifth embodiment of the present invention.

FIG. 17 is a view to explain an image presentation method in accordance with an embodiment of the present invention and also explain a method of minimizing blurring of images displayed on the transmissive display unit 102 positioned on the inner side in view of the observer 100 in the three-dimensional display device 103 of the first to fourth embodiments. FIG. 17(a) shows one example of the luminance of an original image. FIG. 17(b) shows the luminance of an emphatic image that a later-mentioned image processing is applied on the edge areas of the original image of FIG. 17(a). FIG. 17(c) shows the luminance that an observer feels against the emphatic image of FIG. 17(b).

The image presentation method of this embodiment is characterized by displaying, as an image to be displayed on the transmissive display unit 102 on the inner side, not the original image itself but an emphatic image obtained by applying an image processing on the original image.

According to the image presentation method of this embodiment, it is performed to apply an emphatic image processing on the original image in a manner that, when looking at an image displayed on the transmissive display unit 102 on the inner side through the moiré vanishing element 120, the observer 100 can observes this image as an image close to the original image.

Note that FIGS. 17(a) to 17(c) explain the image presentation method of this embodiment with reference to the straight luminance in the horizontal direction of the image displayed on the transmissive display unit 102 on the inner side.

When the luminance of an original image G1 changes in a step-like pattern as shown in FIG. 17(a), it is carried out to drafts as the image to be actually displayed in the transmissive display unit 102 positioned on the inner side, an emphatic image G2 that an image enhancement is applied on an edge area of the original image G1 so as to have an overshoot luminance distribution, as shown in FIG. 17(b). Consequently, since an actual image visible to the observer 100 is equivalent to the emphatic image G2 with a smudged state, the actual image has a luminance generally equal to that of the original image G1.

There is "Unsharp Mask" as one example of the image processing in the image presentation method of this embodiment. This processing is to display an image G2 obtained by applying a processing corresponding to {G1−k (G3−G1)} on the original image G1 and the image G3 as a result of smudging the original image G1. Note that "k" is an optional number. Thus, when emphasizing the original image G1 by subtracting a difference between the smudged image G3 and the original image G1 from the original image G1, the observer 100 see the image G2 closer to the original image G1 generally.

In a three-dimensional display device adopting a polarization plate, in which LCD panels (diagonal size: 8 inches; pixel number: 800×400 pixels) are laminated on each other with the intervals of 4 mm and further subjected to anti-glare processing, as the nearest polarization plate, we display an image subjected to "unsharp mask" having a radius of 0.5 to 1 pixel, the applicable quantity of 200% and the threshold value of 0 by using a commercial image processing software. Consequently, there was observed an image behind which any blurring is unfelt.

Figure 18:
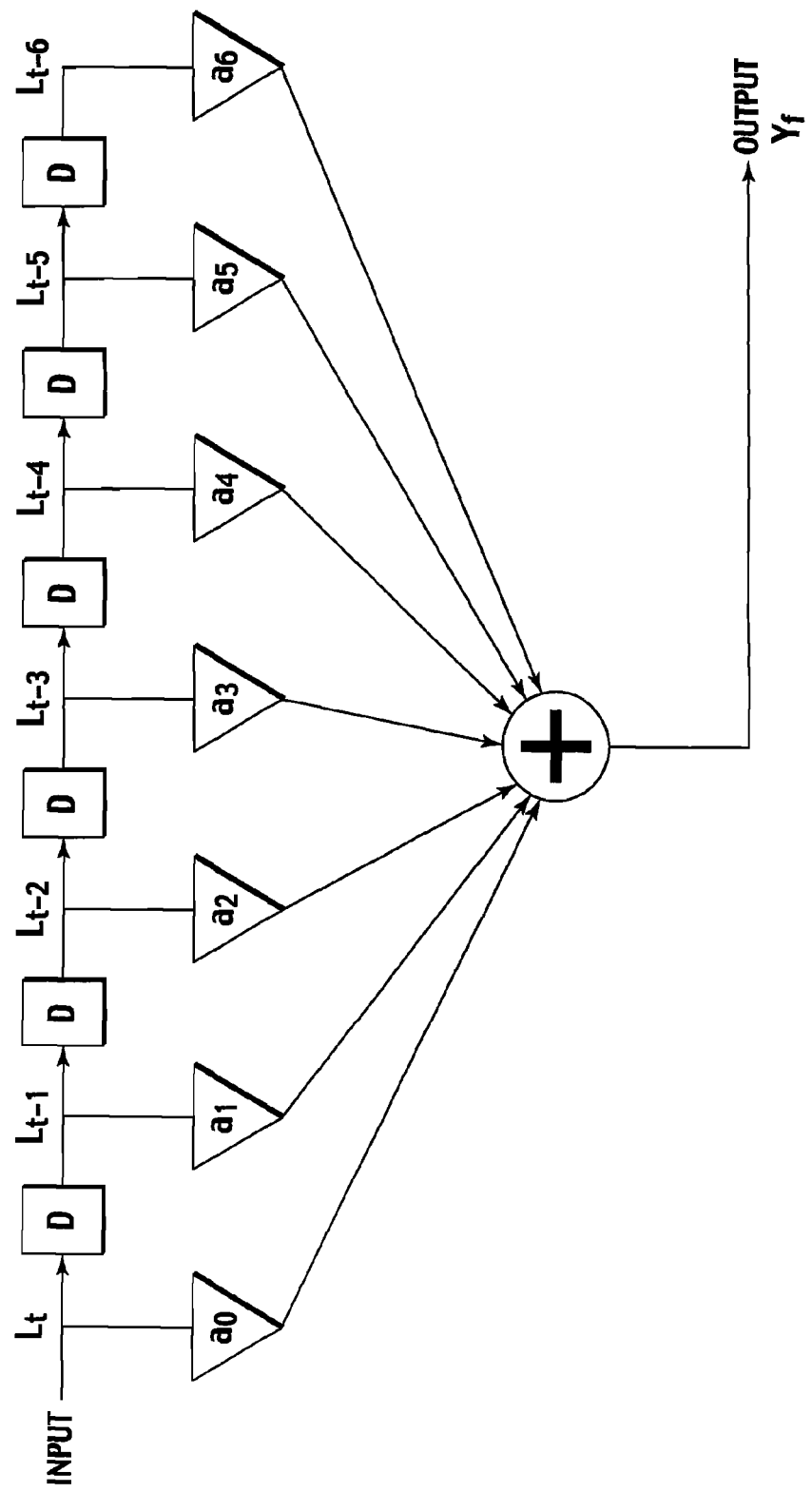
FIG. 18 is a view to explain one example of the image presentation method in accordance with the fifth embodiment of the present invention.

It is frequently performed to apply two-dimensional Gauss blurring in generating the emphatic image G2 from the original image G1 by the image enhancement using "unsharp mask". However, if adopting the blurring function of a moiré vanishing element, then the image quality is improved furthermore. If a moiré vanishing element is provided with anisotropy, it is preferable that the blurring function is also provided with anisotropy. In this case, as the direction of "unsharp mask" becomes a single direction, it is possible to construct one-directional filter (output signal: $Y_t=\Sigma_{k=0\sim 6}\, a_k L_{t-k}$) for a luminance signal L (note: a luminance signal at time t will be represented by $L_t$.) as the input signal easily, as shown in FIG. 18. In FIG. 18, "D" denotes a delay. If the original image G1 is a colored image, the above filter has to be applied on each luminance of three primary colors. This filter may be formed by either a digital filter or an analogue circuit such as combination of operational amplifier and a delay line. Although it is most effective that a sampling point of the filter is established in units of pixels, the establishment may be modified. Additionally, the number of sampling points illustrated in FIG. 18 (i.e. seven points) is nothing but one example and therefore any number of sampling points will do so long as they could cover a range where at filtering coefficient "a" is attenuated down to approx. 0.

Although the above descriptions explain the "unsharp mask" processing in this embodiment, it may be replaced by other image processing methods, for example, Wiener filter, Laplacian filter, Deconvolution, etc.

In the image presentation method of this embodiment, the transmissive display unit 102 on the inner side may be provided with image processing means that carries out the above-mentioned image enhancement at the three-dimensional displaying. On the assumption that an image upon the above-mentioned image enhancement is stored in specified storing means in advance, alternatively, it may be carried out at the three-dimensional displaying to input the above image into the transmissive display unit 102 on the inner side and further allow it to display the same image. This modification would be effective if the transmissive display unit 102 on the inner side has no image processing means.

Hereinabove, although the present invention is concretely described based on the first to fifth embodiments, the invention is not limited to these embodiments and various changes may be made within the scope of contents.

INDUSTRIAL APPLICABILITY

According to the present invention, in a three-dimensional display device having a plurality of transmissive display units arranged in different depth positions in view from an observer; it is possible to prevent the occurrence of moiré and, it becomes possible to be insensible for an observer to blurring on a screen of a display unit on the deep side of the device.

The invention claimed is:

1. A three-dimensional display device comprising:
    a plurality of transmissive display units arranged in different depth positions in view from an observer;
    and a moiré vanishing element that diffuses a light, where in the moiré vanishing element has a spatial frequency characteristic to cut off a spatial frequency more than a spatial frequency having a cycle being twice as large as a width of black matrix between pixels forming a first transmissive display unit arranged behind the moiré vanishing element in the view from the observer.

2. The three-dimensional display device of claim 1, where in the cut-off frequency of the moiré vanishing element is equal to a highest spatial frequency of spatial frequencies that the first transmissive display unit can display.

3. The three-dimensional display device of claim 1, where in the plurality of transmissive display units have polarization plates respectively.

4. The three-dimensional display device of claim 1, where in the moiré vanishing element is arranged so as to be close to the observer in comparison with a second transmissive display unit closest to the observer in the view from the observer.

5. The three-dimensional display device of claim 1, where in the moiré vanishing element is an optical element composed of a first transparent material having a plurality of dimples formed on a surface of the first transparent material randomly.

6. The three-dimensional display device of claim 5, where in the moiré vanishing element is the optical element where the plurality of dimples are filled up with a second transparent material having a different refractive index from a refractive index of the first transparent material.

7. The three-dimensional display device of claim 1, where in the moiré vanishing element is a diffusible polarization plate.

8. The three-dimensional display device of claim 1, where in the moiré vanishing element is a prism provided on one surface of the first transmissive display unit, the surface being far from the observer in comparison with the other surface of the first transmissive display unit.

9. The three-dimensional display device of claim 1, where in the moiré vanishing element is a diffraction grating for dividing a light into plural lights.

10. The three-dimensional display device of claim 1, where in the moiré vanishing element has a diffusing characteristic to diffuse a light with anisotropy.

11. The three-dimensional display device of claim 10, where in the first transmissive display unit is formed by striped color pixels, and the moiré vanishing element is arranged so that its direction exhibiting small diffusivity coincides with a direction along which the colored pixels of uniform color continue.

12. The three-dimensional display device of claim 11, wherein when a diffusion width of the moiré element in the direction exhibiting small diffusivity is smaller than an interval of the color pixels forming the first transmissive display unit, and the moiré vanishing element is arranged upon rotating the moiré vanishing element so that an angle between the direction of the moiré vanishing element exhibiting small diffusivity and the direction along which the colored pixels of uniform color continue becomes less than 45 degrees.

13. The three-dimensional display device of claim 1, where in the first transmissive display unit has image processing means, and the image processing means produces an image obtained by applying an image enhancement on an original image and allows the first transmissive display unit to display the image produced.

14. The three-dimensional display device of claim 10, where in the first transmissive display unit has image processing means, and the image processing means produces an image obtained by applying an image enhancement on an original image in a direction of the moiré vanishing element exhibiting large diffusivity and allows the first transmissive display unit to display the image produced.

15. The three-dimensional display device of claim 13 or claim 14, where in the image enhancement for the original image by the image processing means is carried out with use of one of Unsharp mask, Wiener filter, Laplacian filter and Deconvolution.

16. An image presentation method comprising:
    arranging a plurality of transmissive display units and a moiré vanishing element for diffusing light in different depth positions in view from an observer:
    enhancing an original image so that the observer can see an image close to the original image when viewing a transmissive display unit behind the moiré vanishing element in view of the observer; and
    allowing the transmissive display unit behind the moiré vanishing element in view of the observer to display the image enhanced,
    wherein the moiré vanishing element has a spatial frequency characteristic to cut off a spatial frequency more than a spatial frequency having a cycle being twice as large as a width of black matrix between pixels forming the transmissive display unit.

* * * * *